United States Patent [19]

Fujii et al.

[11] Patent Number: 5,318,758

[45] Date of Patent: Jun. 7, 1994

[54] APPARATUS AND PROCESS FOR REMOVING CARBON DIOXIDE FROM COMBUSTION EXHAUST GAS

[75] Inventors: Masumi Fujii, Ikoma; Yoshitsugu Hotta, Osaka; Taiichiro Suda, Nara; Kenji Kobayashi, Osaka; Kunihiko Yoshida, Kyoto; Shigeru Shimojo, Osaka; Mutsunori Karasaki; Masaki Iijima, both of Tokyo; Fumio Tomikawa, Kawasaki; Touro Seto; Shigeaki Mitsuoka, both of Hiroshima, all of Japan

[73] Assignees: Mitsubishi Jukogyo Kabushiki Kaisha, Tokyo; Kansai Electric Power Co., Inc., Osaka, both of Japan; a part interest

[21] Appl. No.: 847,733

[22] Filed: Mar. 9, 1992

[30] Foreign Application Priority Data

Mar. 7, 1991 [JP] Japan ................ 3-041854
Jan. 17, 1992 [JP] Japan ................ 4-006469

[51] Int. Cl.$^5$ ............................. B01D 53/34
[52] U.S. Cl. ..................... 423/228; 423/229; 55/222; 95/211; 95/229; 95/236
[58] Field of Search ............ 423/228, 229; 55/222, 55/94; 261/148, 149, 152; 95/211, 229, 236

[56] References Cited

U.S. PATENT DOCUMENTS

| | | | |
|---|---|---|---|
| 2,466,183 | 4/1949 | Reed | 423/229 |
| 2,487,576 | 11/1949 | Meyers | 423/242.3 |
| 2,592,762 | 4/1952 | Taylor et al. | 423/229 |
| 3,288,557 | 11/1966 | Bresler | 423/229 |
| 3,435,590 | 4/1969 | Smith | 55/94 |
| 3,563,696 | 2/1971 | Benson | 423/232 |
| 3,565,573 | 2/1971 | Thirkell | 423/229 |
| 3,773,895 | 11/1973 | Thirkell | 423/229 |
| 4,073,673 | 2/1978 | Giammarco et al. | 423/228 |
| 4,367,258 | 1/1983 | Lagana et al. | 423/229 |
| 4,409,191 | 10/1983 | Osman | 423/228 |
| 4,440,731 | 4/1984 | Pearce | 423/228 |
| 4,461,749 | 7/1984 | Thorn | 423/228 |

FOREIGN PATENT DOCUMENTS

| | | | |
|---|---|---|---|
| 820216 | 8/1969 | Canada | 423/229 |
| 0192195 | 8/1986 | European Pat. Off. | |
| 1813118 | 7/1969 | Fed. Rep. of Germany | |
| 2601717 | 7/1977 | Fed. Rep. of Germany | |
| 3193116 | 8/1991 | Japan | 423/220 |

Primary Examiner—Gary P. Straub
Assistant Examiner—Peter T. DiMauro
Attorney, Agent, or Firm—Jacobson, Price, Holman & Stern

[57] ABSTRACT

An apparatus and a process for removing $CO_2$ from a combustion exhaust gas, by effecting counterflow contact of aqueous alkanolamine solution with the combustion exhaust gas to absorb $CO_2$ from the gas in the alkanolamine solution and effecting a further contact of the gas with either, condensate water formed by causing condensation of the gas after removal of $CO_2$, or condensate water formed by causing condensation of the combustion exhaust gas directly after combustion of the fuel. The apparatus includes a tower (1), a first contact section (2) in the tower through which the exhaust gas flows upwardly in counterflow contact with the aqueous alkanolamine solution dispersed by a nozzle device (7) downstream of the first contact section (2), a second contact section (3) in the tower (1) downstream of the nozzle device (7) for effecting counterflow contact of reflux water from a spent absorbent liquor regenerating tower (28) with the gas after removal of $CO_2$. The temperature of the aqueous alkanolamine solution to be supplied to the $CO_2$-removing tower (1) is adjusted in such a manner that the temperature of the exhaust gas at the entrance (4) of the $CO_2$-removing tower and that of the treated gas at the exit (5) of the $CO_2$-removing tower are the same.

4 Claims, 3 Drawing Sheets

APPARATUS AND PROCESS FOR REMOVING CARBON DIOXIDE FROM COMBUSTION EXHAUST GAS

BACKGROUND OF THE INVENTION

The present invention relates to a process for removing carbon dioxide from combustion exhast gas, in particular, that uses an alkanolamine as the absorbent, and to an apparatus to be employed therefor.

In recent years, the so-called "greenhouse effect" due to increasing concentration of $CO_2$ in the atmosphere has come to the forefront as an essential causal factor for the phenomenen of global climatic warming. Thus, it has become an international urgent theme to provide an effective countermeasure therefor, in order to realize protection of the global environmental condition. $CO_2$ has many origins widespread over every field of human activity that uses combustion of fossile fuels. It is therefore an international trend to prescribe a more strict limitation on the amount of emission of $CO_2$ into the atmosphere. Under these circumstances, there has been developing intensive research, in particular, in power plants which consume large amounts of consumption of fossile fuel, to achieve an effective technical measure of recovering $CO_2$ by bringing combustion exhaust gas from boiler plants into contact with an absorbent, such as an aqueous solution of an alkanolamine etc., and to achieve a practical way for effecting storage of the recovered $CO_2$ without exhausting it into the atmosphere.

Here, there may be employed as the absorbent for $CO_2$, for example, aqueous solutions of alkanolamines, such as monoethanolamine, diethanolamine, triethanolamine, methyl diethanolamine, diisopropanolamine and diglycolamine as well as mixtures of these amines. Among them, usually an aqueous solution of monoethanolamine (abbreviated hereinafter as MEA) is employed preferably in a form of an aqueous solution.

One typical example of an apparatus for effecting the conventional process for $CO_2$ removal using an aqueous solution of monoethanolamine (MEA) as the absorbent is explained now with reference to FIG. 4 appended herewith.

The apparatus shown in FIG. 4, which may be employed primarily for removing $CO_2$ from the combustion exhaust gas from a fire source using a hydrogen-rich fuel, such as liquefied natural gas (LNG), consists essentially of a $CO_2$-removing tower 01, which comprises a lower packed section 02 for effecting an essential absorption of $CO_2$ from the combustion exhaust gas by an MEA aqueous solution; an upper packed section 03 for effecting depletion of MEA content in the gas after having been treated in the lower packed section 02; an entrance 04 for the combustion exhaust gas supplied; an exit 05 of the final treated gas; a supply line 06 for the aqueous MEA solution; a first nozzle assembly 07 for spraying the MEA aqueous solution; a condensate accumulating tray 08, which may eventually be dispensed with, for receiving the condensate formed in the upper packed section 03; a circulation pump 09 for maintaining circulation of the condensate within the upper packed section; a heat exchanger 010 for effecting cooling of the condensate; a second nozzle assembly 011 for spraying the circulating condensate over the upper packed section 03; a discharge outlet 012 for discharging the spent aqueous MEA solution containing the absorbed $CO_2$ out of the tower 01; and a feed blower 013 for boosting the combustion exhaust gas from a primary scrubbing stage into the absorption tower 01 via the entrance 04. The primary scrubbing stage consists essentially of a circulation system comprising a cooling section 015 for cooling the combustion exhaust gas supplied via a gas supply conduit 014 to effect condensing of the moisture content in the exhaust gas; a circulation pump 016 for circulating the condensate; a heat exchanger 017 for effecting heat exchange to cool the circulating condensate; and a nozzle assembly 018 for spraying the cooled condensate over the cooling section 015 to effect cooling and primary scrubbing of the combustion exhaust gas, and is provided with a condensate extracting line 019 for extracting the excessive amount of condensate out of the system.

The combustion exhaust gas from, for example, the boiler plant of a power station, having in general a temperature of 100–150° C., is supplied first to the primary scrubbing stage, in which it is cooled in the cooling section 015 while forming a condensate which accumulates in its bottom and is employed as the cooling and scrubbing liquor sprayed from the nozzle assembly 018 under circulation by the circulation pump 016 with cooling by the heat exchanger 017, wherein a part of the condensate is continuously extracted out of the system via the extraction line 019. The combustion exhaust gas after having passed the primary scrubbing stage is supplied to the $CO_2$-removing tower 01 at the entrance 014 via a booster blower 013. The combustion exhaust gas supplied to the $CO_2$-removing tower is brought into contact with an aqueous MEA solution having a definite temperature and concentration supplied from the supply line 06 and sprayed from the first nozzle assembly 07 over the lower packed section 02 in counterflow to the rising gas, whereby the $CO_2$ content in the combustion exhaust gas is removed by absorption by the aqueous MEA solution. The aqueous MEA solution containing thus the absorbed $CO_2$ is discharged out of the $CO_2$-removing tower 01 via the outlet 012 and is then fed to a regeneration tower, not shown, for regenerating the spent aqueous MEA solution, from which the regenerated aqueous MEA solution is returned to the $CO_2$-removing tower 01 at the supply line 06.

On the other hand, the combustion exhaust gas which has been subjected to the $CO_2$ removal in the lower packed section 02 flows up passing through a layer of the condensate accumulated on the condensate accumulation tray 08 into the upper packed section 03. The temperature of the gas entering the upper packed section 03 has been elevated by the exothermal reaction of absorption of $CO_2$ with MEA effected in the lower packed section 02, so that the gas entering the upper packed section 03 has a higher content of vaporized MEA corresponding to the saturation concentration thereof in the gas at such elevated temperature. Therefore, the combustion exhaust gas which has thus been subjected to the $CO_2$ removal should not be exhausted out to the atmosphere as such in consideration of the possible pollution of the atmosphere and the loss of MEA. Thus, the combustion exhaust gas having been denuded of its $CO_2$ content in the lower packed section 02 is then treated in the upper packed section 03 in such a manner that a suitable amount of the condensate formed and separated in the upper packed section is sprayed over the upper packed section 03 through the second nozzle assembly 011 under circulation thereof by the circulation pump 09 through a cooling means (the heat exchanger 010) so as to effect contact of the cooled condensate with the rising gas in counterflow to each other to lower the temperature of the gas while at the same time to condense the water vapor together with MEA to decrease the MEA concentration in the gas, in order to prevent discharge of any harmful amount of MEA into the atmosphere.

The above example of the prior technique shown in FIG. 4 is employed primarily for firing stations using a fuel containing a substantial amount of hydrogen, such as LNG, capable of forming a sufficient amount of water vapor originated from the combustion of such a hydrogen-rich fuel for permitting use as the water source for building up the aqueous MEA solution and for cooling the combustion exhaust gas. The condensate thus formed is exhausted from the line 019 as excess water.

Alternatively, there has been proposed also a system in which the cooling of the combustion exhaust gas is effected using an externally supplied amount of water, which may be employed principally for boiler plants burning a fuel having high content of carbon, such as coal, heavy oil or so on. Here, it is, in general, unnecessary to provide the heat exchanger 017, as will be explained later on, but is only necessary to bring the combustion exhaust gas into contact with water held in circulation within the system to effect cooling of the combustion exhaust gas by the latent heat of vaporization of water. Here, an amount of fresh water should be supplied from outside, in order to replenish the amount of water lost gradually during the operation by giving off to the atmosphere by evaporation.

Though the prior art explained as above with reference to the appended FIG. 4 may be useful as such for a specific field of application, it possesses a disadvantage that the level of leakage of the absorbent, i.e. MEA, from the $CO_2$-removing tower into the atmosphere is still high, causing thereby a corresponding degree of atmospheric pollution and a larger loss of the expensive absorbent. In addition, it was recognized that ammonia was detected, though in a quite small amount, in the gas discharged out to the atmosphere from the exit 05 of the $CO_2$-removing tower 01 of the prior art apparatus. This ammonia may assumably be derived from a partial decomposition of MEA in the treatment system. It may also be possible for the reason therefor that the fuel would have had originally a residual ammonia content added in order to decrease the $NO_x$ level in the combustion exhaust gas. In any case, an occurrence of ammonia, though in a trifling amount, may be a further origin of unpleasant smell and bring about an emvironmental pollution when emitted to the atmosphere, so that it has to be removed from the gas before it is discharged out to the atmosphere. Here, it was a problem that the level of ammonia is quite low and, therefore it has to be removed at a sufficient efficiency.

SUMMARY OF THE INVENTION

Starting from the prior technique of removal of $CO_2$ in the combustion exhaust gas from fire sources explained above, the present invention has as its primary object to provide a process and an apparatus for removing $CO_2$ in the combustion exhaust gas from fire sources, which can permit a considerable lowering of the amount of loss of the alkanolamine employed for the absorbent and thus a substantial reduction of the atmospheric pollution therefrom as compared with the prior art techniques.

The inventors have found in their research carried out for the technical subject set forth above that it was effective for the object of the present invention to bring reflux water from a spent absorbent liquor regeneration tower into contact, within the $CO_2$-removing tower, with the combustion exhaust gas having been subjected to the $CO_2$ removal, and has completed the present invention.

The essential features of the present invention are as given below:

1) An apparatus for removing $CO_2$ from a combustion exhaust gas by contacting the exhaust gas in an exhaust gas path with an absorbent consisting of an aqueous solution of an alkanolamine, comprising a first contact section disposed in the exhaust gas Path for effecting contact of the aqueous alkanolamine solution with the combustion exhaust gas in counterflow, a cooling means disposed downstream of said first contact section in the exhaust gas path for cooling the $CO_2$-denuded exhaust gas, and a second contact section for effecting contact of the condensate formed by the cooling means with the $CO_2$-denuded exhaust gas in counterflow.

2) A process for removing $CO_2$ from a combustion exhaust gas using an apparatus according to 1) above, comprising maintaining the $CO_2$-denuded exhaust gas at a temperature higher than the saturation point of the moisture in the combustion exhaust gas supplied to the exhaust gas path, condensing an amount of the moisture in the combustion exhaust gas by the cooling means that corresponds to the amount of water brought out of the apparatus in accompaniment with the treated gas discharged out of the apparatus, and supplying the so-formed condensate to the second contact section.

3) An apparatus for effecting removal of $CO_2$ from a combustion exhaust gas by bringing the gas into contact in a $CO_2$-removing means disposed in a combustion gas exhaust path with an aqueous solution of an alkanolamine, comprising a first contact section disposed in the exhaust gas path for effecting a counterflow contact of the aqueous alkanolamine solution with the combustion exhaust gas to attain removal of $CO_2$, from the gas by absorption in the solution, a second contact section disposed downstream of the first contact section in the exhaust gas path for effecting a counterflow contact of the gas having been subjected to the removal of $CO_2$ with water supplied from a water supply means also disposed downstream of the first contact section in the exhaust path, a cooling means disposed upstream of the $CO_2$-removing means in the exhaust path for cooling the combustion exhaust gas to be supplied to the $CO_2$-removing means, and a supply means for supplying the condensate formed by the cooling means to the water supply means.

4) A process for removing $CO_2$, from a combustion exhaust gas using an apparatus according to 3) above, comprising supplying the condensate formed by the cooling means to the water supply means and supplying such an amount of water from the water supply means at the second contact section for effecting contact of the gas having been subjected to the removal of $CO_2$ with the water that corresponds to the amount of water brought out of the apparatus in accompaniment with the treated gas discharged out of the apparatus.

5) An apparatus for removing $CO_2$ from a combustion exhaust gas by bringing the gas into contact in a combustion gas exhaust path with an absorbent consisting of an aqueous solution of an alkanolamine, comprising a first contact section disposed in the exhaust path for effecting a counterflow contact of the aqueous alkanolamine solution with the combustion exhaust gas to attain removal of $CO_2$ from said gas, and a second contact section disposed downstream of the first contact section in the exhaust path for effecting a counter flow contact of a reflux water from a spent absorbent liquor regenerating tower with the gas having been subjected to the removal of $CO_2$.

6) A process for removing $CO_2$ from a combustion exhaust gas using an apparatus according to 5) above, comprising adjusting the temperature of the aqueous alkanolamine solution to be supplied to the $CO_2$-removing means, in such a manner that the temperature of the gas at the entrance of the $CO_2$-removing means and that at the exit of the $CO_2$-removing means become substantially identical.

DETAILED DESCRIPTION OF THE INVENTION

The present invention will now be explained in detail with reference to FIGS. 1 to 3 of the appended drawings each of which shows an embodiment of the present invention in a schematic illustration.

Figure 1:
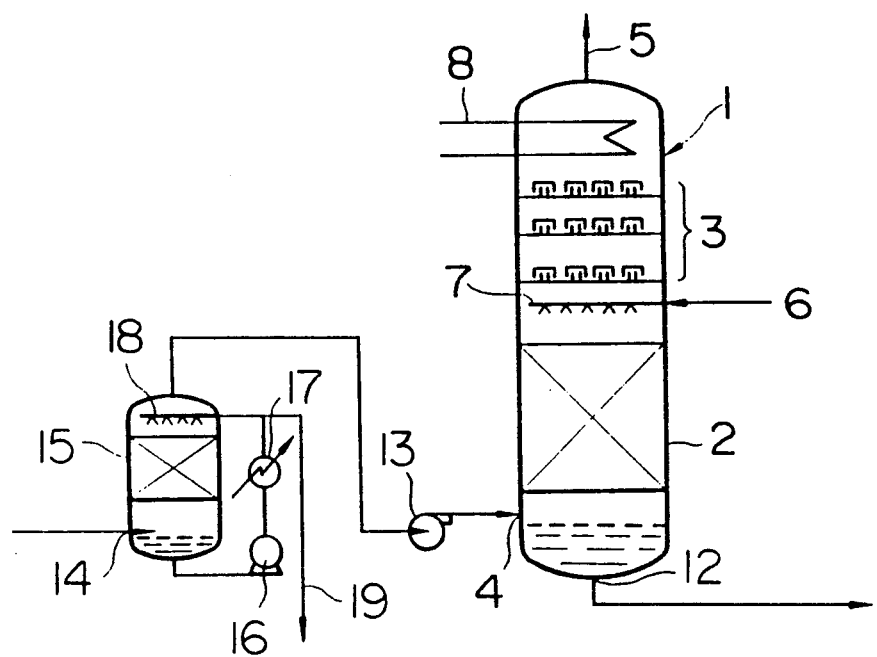
FIG. 1 is a schematic illustration of an embodiment of the apparatus according to the present invention.

The apparatus shown in FIG. 1 consists essentially of a $CO_2$-removing tower 1 which comprises a lower packed section 2 for effecting an essential absorption of $CO_2$ of the combustion exhaust gas by an MEA aqueous solution; an upper contact section 3 constructed as a tray assembly for effecting depletion of MEA content in the gas after being treated in the lower packed section 2; a gas entrance 4 for the combustion exhaust gas supplied; an exit 5 of the final treated gas; a supply line 6 for the aqueous MEA solution; a first nozzle assembly 7 for spraying the MEA aqueous solution; a cooling means 8 for cooling the gas after it has been subjected to the $CO_2$ removal; a discharge outlet 12 for discharging the spent aqueous MEA solution containing the absorbed $CO_2$ from the tower 1; a feed blower 13 for boosting the combustion exhaust gas into the $CO_2$-removing tower 1 from a primary scrubbing stag; a cooling section 15 for cooling the combustion exhaust gas supplied via a gas supply conduit 14 to effect condensing of the moisture content in the combustion exhaust gas; a circulation pump 16 for circulating the condensate., a heat exchanger 17 for effecting heat exchange to cool the circulating condensate; a nozzle assembly 18 for spraying the cooled condensate over the cooling section 15 to effect cooling and primary scrubbing of the combustion exhaust gas and a condensate extracting line 19 for extracting the excessive amount of the condensate out of the system.

Figure 4:
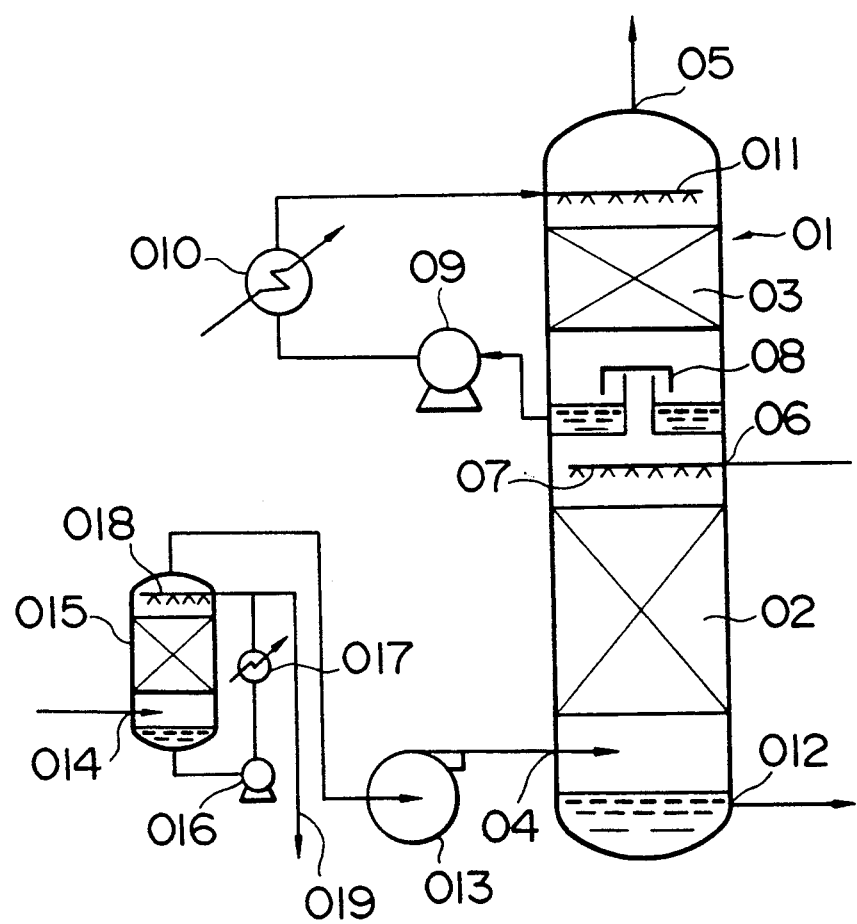
FIG. 4 shows a schematic illustration of a typical embodiment showing the conventional apparatus of the technique.

The gas from which a part of the moisture content has been removed in the primary scrubbing stage as condensate, in the manner explained with reference to FIG. 4, is then supplied to the $CO_2$-removing tower at the entrance 4 and is brought into contact in the lower packed section 2 with an aqueous MEA solution having a definite temperature and concentration supplied from the supply line 6 and sprayed from the first nozzle assembly 7 over the lower packed section 2 in counterflow to each other, whereby the $CO_2$ content in the combustion exhaust gas is removed by absorption by the aqueous MEA solution. The aqueous MEA solution containing the absorbed $CO_2$ is discharged out of the $CO_2$-removing tower 1 via the discharge outlet 9 and is then fed to a regeneration tower, not shown, for regenerating the spent aqueous MEA solution, from which the regenerated aqueous MEA solution is returned to the $CO_2$-removing tower 1 at the supply line 6.

The combustion exhaust gas which has been subjected to the removal of $CO_2$ in the lower packed section 2 and having entrained therein the vapor of MEA flows up inside the tower 1 into the upper contact section 3. Here, the amount of condensate formed in the upper contact section 3 by the cooling means 8 must be controlled by adjusting the flow rate of the coolant flowing inside the cooling means 8 so that the rate of condensate formation will corresponds to the rate of total outgo of the moisture content from the system. Otherwise, the mass balance of water in the system comprised of the $CO_2$-removing tower 1 and the not shown spent absorbent regeneration tower connected therewith becomes destroyed, so that the concentration of the aqueous MEA solution supplied to the $CO_2$-removing tower 1 at the entrance 6 will not be kept constant.

By the absorption reaction effected on contact of the rising stream of the $CO_2$-denuded gas containing now vapor of MEA with the falling condensate formed by cooling on the cooling means 8 in the upper contact section 3, the MEA vapor concentration in the rising stream of the $CO_2$-denuded gas will be lowered by an approximate decimal order of two per unit theoretical plate in the upper contact section 3. By selecting an adequate number of actual trays, it is possible to adjust the amount of MEA brought out of the system in accompaniment with the discharged treated gas via the exit 5 to a level of nearly zero.

Figure 2:
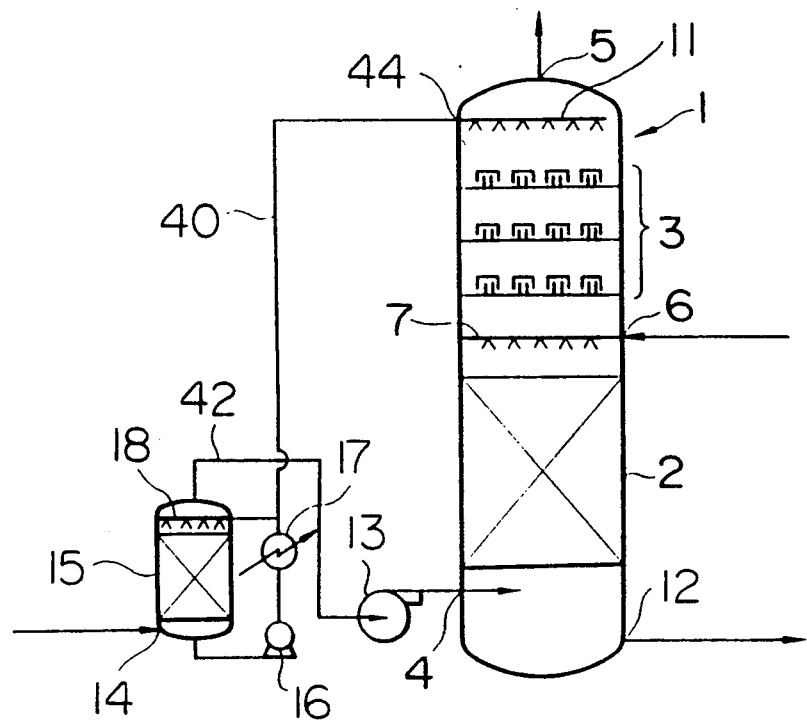
FIG. 2 is a schematic illustration of another embodiment of the apparatus according to the present invention.

Now, the description will be directed to the second embodiment according to the present invention shown in FIG. 2.

The apparatus shown in FIG. 2 consists essentially of a $CO_2$-removing tower 1, which comprises a lower packed section 2 for effecting an essential absorption of $CO_2$ of the combustion exhaust gas by an MEA aqueous solution; an upper contact section 3 for effecting depletion of MEA content in the gas after having being treated in the lower packed section 2; an entrance 4 for the combustion exhaust gas supplied; an exit 5 of the final treated gas; a supply line 6 for the aqueous MEA solution; a first nozzle assembly 7 for spraying the MEA aqueous solution; a condensate supply inlet 8 for supplying the condensate formed in the primary scrubbing stage via a condensate supply line 40 to the upper contact section 3; a discharge outlet 12 for discharging the spent aqueous MEA solution containing the absorbed $CO_2$ out of the tower 1; a feed blower 13 for boosting the combustion exhaust gas fed through line 42 into the $CO_2$-removing tower 1 from a primary scrubbing stage; a cooling section 15 for cooling the combustion exhaust gas supplied via a gas supply inlet 14 to effect condensing of the moisture content in the exhaust gas; a circulation pump 16 for circulating the condensate; a heat exchanger 17 for effecting heat exchange to cool the circulating condensate., a nozzle assembly 18 for spraying the cooled condensate over the cooling section 15 to effect cooling and primary scrubbing of the combustion exhaust gas; and a combustion exhaust gas supply line 42 for supplying the combustion exhaust gas from the primary scrubbing stage. The combustion exhaust gas enters first the primary scrubbing stage via the inlet 14 and passes the cooling section 15 wherein it is cooled by contact with the circulated condensate cooled by the heat exchanger 17 and sprayed from the spray nozzle assembly 18, whereby the moisture content thereof is condensed and the condensate is accumulated in the bottom. The gas is then supplied to the $CO_2$-removing tower 1 through a boosting blower 13 at the entrance 4, while the condensate accumulated in the bottom is supplied to the upper contact section 3 via the supply line 40 and the condensate supply inlet 44.

The gas of which a part of the moisture content has been removed in the primary scrubbing stage as condensate is then supplied to the $CO_2$-removing tower at the entrance 4 and is brought into contact in the lower packed section 2 with an aqueous MEA solution having a given temperature and concentration supplied from the supply line 6 and sprayed from the first nozzle assembly 7 over the lower packed section 2 in counterflow to each other, whereby the $CO_2$ content in the combustion exhaust gas is removed by absorption by the aqueous MEA solution The aqueous MEA solution containing thus the absorbed $CO_2$ is discharged out of the $CO_2$-removing tower 1 via the discharge outlet 12 and is then fed to a regeneration tower, not shown, for regenerating the spent aqueous MEA solution, from which the regenerated aqueous MEA solution is returned to the $CO_2$-removing tower 1 via the supply line 6.

The combustion exhaust gas which has been subjected to the removal of $CO_2$ in the lower packed section 2 and containing entrained therein the vapor of MEA flows up inside the tower 1 into the upper contact section 3 and is brought there into contact with the condensate supplied from the condensate supply inlet 44 in counterflow with each other. Here, the amount of condensate supplied via the condensate supply inlet 44 must be controlled by adjusting the flow rate of the coolant flowing inside the cooling section 15 or the flow rate of the condensate passing the spray nozzle assembly 11 so that the rate of condensate formation will correspond to the rate of total outgo of the moisture content from the system. Otherwise, the mass balance of water in the system comprised of the $CO_2$-removing tower 1 and the not shown spent absorbent regeneration tower connected therewith becomes destroyed, so that the concentration of the aqueous MEA solution supplied to the $CO_2$-removing tower 1 at the entrance 6 will not be kept constant.

This embodiment of the present invention produces the same advantageous effects as that described with reference to FIG. 1.

As seen from the description of the preferred embodiments set forth above, it is possible by the process and the apparatus according to the present invention to attain a condition in which the amount of the alkanolamine absorbent lost to the atmosphere becomes close to zero, whereby it is possible to avoid the possible atmospheric pollution due to the leakage of the absorbent and also attain a marked economization of the energy consumption for the circulation of fluids as compared with the conventional technique such as shown in FIG. 4, with simultaneous omission of the heat exchanger 010 to be installed therewith.

Below, each feature of the above embodiments shown in FIGS. 1 and 2 is summarized in Tables 1 and 2 in comparison with that of the conventional technique explained by FIG. 4, in order to visualize the technical advantages realized by the present invention.

TABLE 1

| Feature | Embodiment of FIG. 1 | Prior Art of FIG. 4 |
|---|---|---|
| Vol. of CE[1] $Nm^3/hr$ | 1612 | 1612 |
| Press. of CE | atmos. | atmos. |
| $CO_2$ conc. of CE mole % | 8.0 | 8.0 |
| $H_2O$ conc of CE mole % | 16.8 | 16.8 |
| Cooled gas temp. °C. | 46 | 46 |
| Gas vol. at TE[2] $Nm^3/hr$ | 1500 | 1500 |
| $CO_2$ conc. at TE mole % | 9.2 | 9.2 |
| $H_2O$ conc. at TE mole % | 10.6 | 10.6 |
| CE Temp. at TE °C. | 55 | 55 |
| Amt. of aq. MEA[3] kg/hr | 4350 | 4350 |
| Temp. of aq. MEA °C. | 38 | 38 |
| Temp. of $CO_2$-MEA[4] °C. | 52 | 52 |
| $CO_2$-Absorp. yield % | 90 | 90 |
| CE temp. at TEx[5] °C. | 63 | 63 |
| MEA conc. at TEx[6] | | |
| No. 1 tray ex[9] | 6.5 ppm | Upper pac. sec.[10] |
| No. 2 tray ex. | 20 ppb | |
| No. 3 tray ex. | 10 ppt | 1.5 ppm |
| Treat. gas temp.[7] °C. | 46 | 46 |
| Coolant F.R.[8] ton/hr | 16.8 | 16.8 |

Notes:
[1] CE = combustion exhaust gas
[2] TE = $CO_2$-removing tower exit of gas
[3] Amount of aq. MEA solution supplied
[4] Temp. of aq. MEA solution at its supply line
[5] Temp. of treated gas at the exit of tower
[6] Conc. of MEA in the treated gas at tower exit
[7] Treated gas temp. at lower packed section exit
[8] Coolant flow rate in the cooling means
[9] At the exit of tray of the theoretical plate No. (numbered from beneath) indicated
[10] At the exit of the upper packed section

TABLE 2

| Feature | Embodiment of FIG. 2 | Prior Art of FIG. 4 |
|---|---|---|
| Vol. of CE[1] $Nm^3/hr$ | 1612 | 1612 |
| Press. of CE | atmos. | atmos. |
| $CO_2$ conc. of CE mole % | 8.0 | 8.0 |
| $H_2O$ conc. of CE mole % | 16.8 | 16.8 |
| Cooled gas temp. °C. | 40 | 46 |
| Gas vol. at TE[2] $Nm^3/hr$ | 1447 | 1500 |
| $CO_2$ conc. at TE mole % | 9.5 | 9.2 |
| $H_2O$ conc. at TE mole % | 7.3 | 10.6 |
| CE Temp. at TE °C. | 49 | 55 |
| Amt. of aq. MEA kg/hr | 4350 | 4350 |
| Temp. of aq. MEA °C. | 38 | 38 |
| Temp. of $CO_2$-MEA[4] °C. | 52 | 52 |
| $CO_2$-Absorp. yield % | 90 | 90 |
| CE temp. at TEx[5] °C. | 63 | 63 |
| MEA conc. at TEx[6] | | |
| No. 1 tray ex.[9] | 2 ppm | Upper pac. sec.[10] |
| No. 2 tray ex. | 2 ppb | |
| | | 1.5 ppm |
| Treat. gas temp.[7] °C. | 57 | 46 |

TABLE 2-continued

| Feature | Embodiment of FIG. 2 | Prior Art of FIG. 4 |
| --- | --- | --- |
| Coolant F.R.[8] ton/hr | 10.9 | 16.8 |

Notes:
[1] CE = combustion exhaust gas
[2] TE = $CO_2$-removing tower exit of gas
[3] Amount of aq. MEA solution supplied
[4] Temp. of aq. MEA solution at its supply line
[5] Temp. of treated gas at the exit of tower
[6] Conc. of MEA in the treated gas at tower exit
[7] Treated gas temp. at lower packed section exit
[8] Coolant flow rate in the cooling means
[9] At the exit of tray of the theoretical plate No. (numbered from beneath) indicated
[10] At the exit of the upper packed section A further alternative embodiment of the present invention is shown in FIG. 3 in which only the essential elements are entered but accessory or subsidiary elements are not shown.

Figure 3:
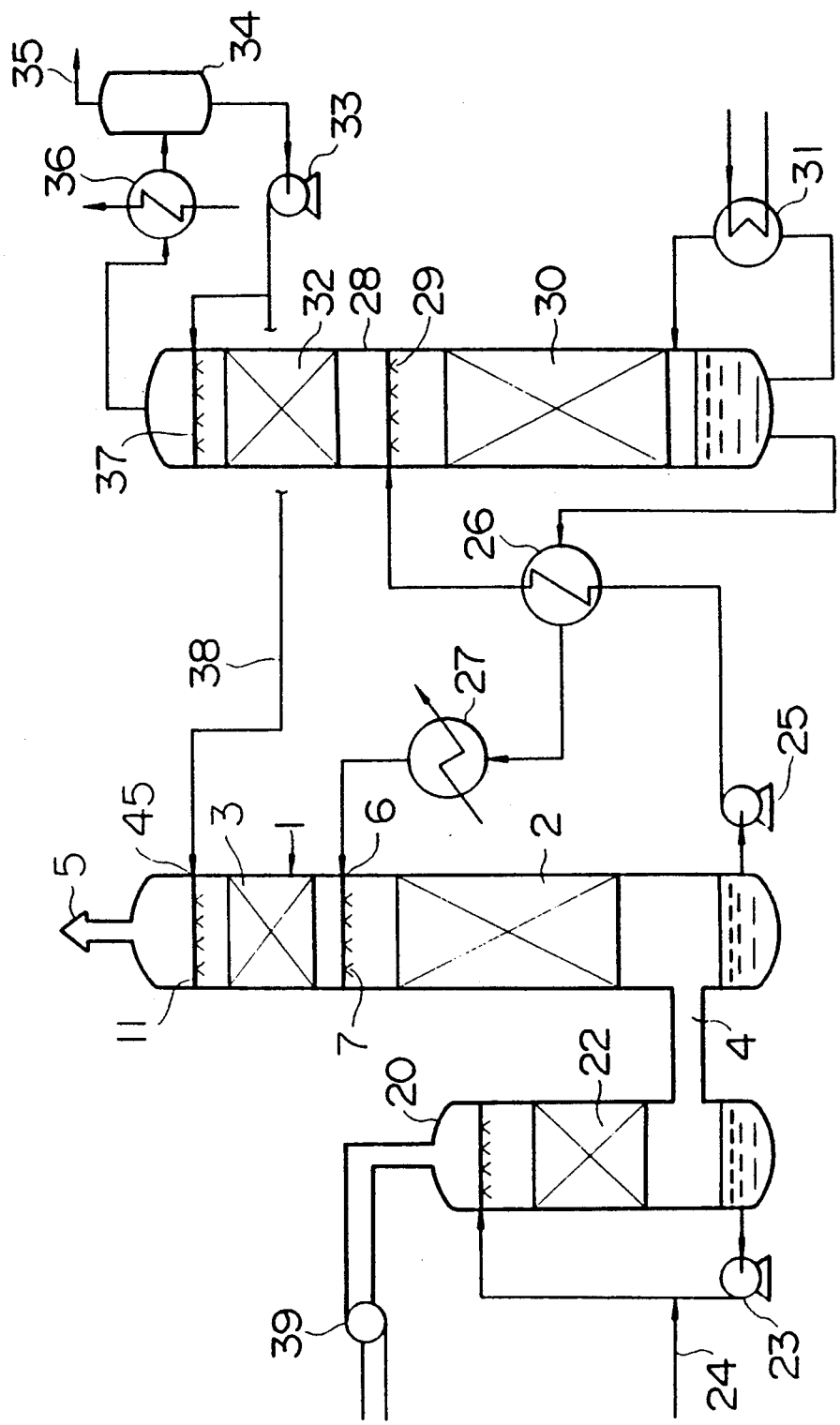
FIG. 3 is a schematic illustration of a still further embodiment of the apparatus according to the present invention.

The apparatus of this embodiment shown in FIG. 3 comprises a $CO_2$-removing tower 1 comprising a lower packed section 2 for effecting an essential absorption of $CO_2$ of the combustion exhaust gas by an MEA aqueous solution; an upper contact section or tray assembly 3 for effecting depletion of MEA content in the gas after having been treated in the lower packed section 14, an entrance 4 for the combustion exhaust gas supplied a gas exit 5 for the final treated gas a supply line 6 for the aqueous MEA solution; a nozzle assembly 7 for spraying the MEA aqueous solution; a reflux water supply inlet 45 for supplying reflux water from a regeneration tower 28 and a further nozzle assembly 11; a primary scrubbing unit 20 for effecting primary scrubbing and cooling of the combustion exhaust gas comprising a nozzle assembly 21, a packed section 22; a circulation pump 23 and a make-up water supply line 24; a delivery pump 25 for draining the spent aqueous MEA solution containing the absorbed $CO_2$; a heat exchanger 26 for effecting heat exchange to recover the heat of the regeneration tower bottom; a cooling means 27 for cooling the absorbent liquor before being sprayed over the lower packed section; a spent absorbent liquor regeneration tower 28 comprising a nozzle assembly 29; a lower packed section 30; a regeneration reboiler 31; an upper packed section 32; a reflux water return pump 33; a) $CO_2$ separator 34; a transfer line 35 for transferring the recovered $CO_2$; a reflux condenser 36 for cooling the overhead of the regeneration tower 28; a nozzle assembly 37 for spraying the reflux water over the upper packed section 32 of the regeneration tower 28; a reflux water supply line 38 from the regeration unit; and a combustion exhaust gas boosting blower 39.

The combustion exhaust gas is boosted by the blower 39 into the primary scrubbing unit 20, in which it is brought into contact with the wetting cooling water 21 sprayed over the packed section 22 and is cooled and moistened. The so-cooled combustion exhaust gas is guided to the $CO_2$-removing tower 11 via the gas entrance 4. The gas temperature at the entrance will reach usually about 50°-80° C., though some deviation may be present in accordance with each specific condition. Since, however, it is unnecessary to cool the gas below such a level as above for treating it by the process according to the present invention, the cooling means 017 shown in FIG. 4 in the prior art tehcnique mentioned previously can be dispensed with.

The wetting cooling water after having been contacted with the combustion exhaust gas will be collected in the bottom of the primary scrubbing unit 20 and is used under circulation by the pump 23 through the nozzle assembly 21. The wetting cooling water will gradually be spent or lost by passing into the hot gas, so that it is necessary to replenish the lost amount through the make-up water supply line 24.

The combustion exhaust gas boosted by the blower 39 is brought into contact in the lower packed section 12 with the aqueous MEA solution having a given concentration sprayed from the nozzle assembly 7, as explained previously with reference to FIG. 4. The $CO_2$ content in the combustion exhaust gas will be absorbed by the aqueous MEA solution and is removed. The resulting $CO_2$-denuded gas is then guided to the upper packed section 13. The aqueous MEA solution supplied to the $CO_2$-removing tower 1 will absorb $CO_2$ and the absorption reaction gives off heat, whereby it is subjected to a heat elevation and reaches a temperature higher than the temperature at the inlet to the absorption tower 1. The so-warmed spent absorbent liquor is passed by the pump 25 to the heat exchanger 26, where it is further heated and then supplied to the spent adsorbent liquor regeneration tower 28.

In this embodiment, most of the reaction heat due to the absorption of $CO_2$ is carried away from the $CO_2$-removing tower 1 by the aqueous MEA solution sent to the regeneration tower 28, by adjusting the temperature of the aqueous MEA solution supplied to the absorption tower 1.

The regulation of the temperature of the aqueous MEA solution can be effected using the heat exchanger 26 or, if necessary, together with a cooling means 27 disposed optionally between the heat exchanger 26 and the aqueous MEA solution supply inlet 6. After a steady state of the entire treating system has been reached, the temperature of the aqueous MEA solution supplied to the absorbing tower 1 will, in general, also become constant. In this manner, the temperature of the gas flowing within the exhaust path will not suffer from substantial temperature elevation even by the heat of the reaction. Thus, the gas flows within the gas exhaust path in the treating system at nearly the same temperature as that of the entrance 4, rising in the tower 1 until it discharges out from the exit. Here, one should understand that the word "same temperature" does not have a strict meaning, but merely it as indicating a certain temperature range within which the mass balance of water in the system can be maintained.

By adjusting the temperature of the aqueous MEA solution supplied from the aqueous MEA solution supply line 6 so that the temperatures of the gas at the gas entrance and the gas exit will be the same, the overall mass balance with respect to water in the treatment system including the absorption tower 1 and other pertaining elements can be maintained. Thus, even though the temperature of the combustion exhaust gas supplied to the absorption tower 1 is in a relatively high range, such as 50°-80° C., the cooling means 010 shown in FIG. 4 of the prior art can be dispensed with. Even if, on the other hand, the temperature of the treated gas exhausted from the absorption tower 1 is at a higher level, any intolerable emission of MEA to the atmosphere can effectively be prevented by the process according to the present invention by using the reflux water fed from the spent absorbent liquor regeneration tower 28 in the absorption tower 11 as will be explained later on.

In the spent absorbent liquor regeneration tower 28, the spent aqueous MEA solution is regenerated with heating by the regeneration reboiler 31 and the regenerated solution is then cooled by the heat exchanger 26 before it is returned to the absoption tower 1. In the upper part of the regeneration tower 28, the gaseous $CO_2$ separated from the aqueous MEA solution is brought into contact with the reflux water sprayed by the nozzle assembly 37, whereupon it is cooled by the regeneration tower reflux condenser 36 and is then separated from the water mist entrained by the stream of $CO_2$ in the $CO_2$ separator 34. The thus separated $CO_2$ is guided to a $CO_2$ recovery stage via the line 35. A part of the reflux water is returned to the regeneration tower 28 by the reflux pump 33.

The essential feature of this embodiment of the present invention resides in the technical measure of supplying a part of the reflux water to the absorption tower 1 through the regeneration tower reflux water supply line 38, the absorption tower inlet 45 and the nozzle assebly 11. By bringing this returned portion of reflux water in the upper packed section or the tray assembly 30 into contact with the $CO_2$-denuded gas having a residual content of MEA vapor, the MEA content in the $CO_2$-denuded gas can be reduced to a level of almost zero. The reflux water having passed through the $CO_2$ separator 34 has a $CO_2$ content corresponding to the saturation concentration at that temperature. For example, if the temperature of the reflux water separated in the $CO_2$ separator 34 is approximately 40° C. or so, the reflux water may have a $CO_2$ content of about 400 ppm.

On the other hand, the $CO_2$-denuded gas after having passed the lower packed section 2 in the absorption tower 1 may have a higher temperature in the range of 50°–80° C. and, thus, it may contain a relatively large amount of vaporized MEA corresponding to the partial pressure of MEA vapor at this temperature and a possible small amount of ammonia together with water steam and is forwarded upward to effect contact with the reflux water supplied from the regeneration tower 28 via the line 38 in counter current flow with respect to each other. Since ammonia and MEA are weakly alkaline and $CO_2$ dissolved in water is weakly acidic, the alkaline absorbent residue will be captured quite easily as compared with the prior art using water for scavenging the residual content of the alkaline absorbent, and the leakage of these substances to the atmosphere can be effectively prevented. The reflux water supplied to the absorption tower 1 is brought into contact with the $CO_2$-denuded gas to effect absorption of MEA and ammonia, whereupon it flows down the absorption tower 1 to the bottom thereof, where it is brought together with the spent aqueous MEA solution before they are sent to the regeneration tower 28. The reflux water to be supplied to the absorption tower 1 constitutes only a part of the total amount of the reflux water and, in addition, it is in any case returned to the regeneration tower 28, so that there occurs no destruction of mass balance of water in the total system.

Incidentally, the residual content of MEA in the $CO_2$-denuded gas will react with the dissolved $CO_2$ in the reflux water in the same manner as that occurring in the lower packed section 2 of the absorption tower 1. All the residual content of ammonia in the $CO_2$-denuded combustion exhaust gas will be absorbed in water by being subjected to a reaction with $CO_2$ in the reflux water in accordance with either of the following equations (1) and (2)

$$NH_3 + CO_2 + H_2O \rightarrow NH_4HCO_3 \qquad (1)$$

$$2NH_3 + CO_2 + H_2O \rightarrow (NH_4)_2CO_3 \qquad (2)$$

to form a carbonate salt and is dissolved in water.

The ammonium carbonates formed as above, in particular $NH_4HCO_3$, are relatively stable in an aqueous solution, so that emission of ammonia into the atmosphere may in some degree be suppressed by being removed from the $CO_2$-denuded gas in the form of these salts. If the $CO_2$ removal teatment is continued for a prolonged period of time as such, these ammonium salts will be accumulated inside the system and may be decomposed in the regeneration step into ammonia, so that a complete prevention of emission of ammonia into the atmosphere is difficult.

In the embodiment of FIG. 3, wet cooling is employed for the cooling of combustion exhaust gas. However, this may not always necessarily be employed, but other cooling means, such as shown in FIG. 4 may also be employed. According to this embodiment of the present invention, however, it is possible to prevent effectively the leakage of residual MEA to the atmosphere by employing the reflux water from the regeneration tower containing dissolved $CO_2$, even though the residual content of MEA in the $CO_2$-denuded gas is relative high due to higher temperature of the gas Therefore, the employment of the cooling means 010 shown in FIG. 4 of the prior art is now unnecessary, whereby a further economical advantage is realized.

Below, each particular feature of the above embodiment of the present invention as shown in FIG. 3 and that for the prior technique of FIG. 4 are summarized in Table 3, in order to visualize the advantageous effects realized by the present invention.

TABLE 3

| Feature | Embodiment of FIG. 3 | Prior Art of FIG. 4 |
|---|---|---|
| Vol. of CE[1] $Nm^3$/hr | 2213 | 2213 |
| Press. of CE | atmos. | atmos. |
| $CO_2$ conc. of CE mole % | 8.6 | 8.6 |
| $H_2O$ conc. of CE mole % | 17.3 | 17.3 |
| Cooled gas temp. °C. | 61 | 46 |
| Gas vol. at TE[2] $Nm^3$/hr | 1752 | 1752 |
| $CO_2$ conc. at TE mole % | 8.3 | 9.3 |
| $H_2O$ conc. at TE mole % | 19.5 | 10.5 |
| CE Temp. at TE °C. | 61 | 55 |
| Amt. of aq. MEA[3] kg/hr | 4367 | 4455 |
| Temp. of aq. MEA °C. | 38 | 38 |
| Temp. of $CO_2$-MEA[4] °C. | 64 | 52 |
| $CO_2$-Absorp. yield % | 90 | 90 |
| CE temp. at TEx[5] °C. | 61 | 46 |
| MEA conc. at TEx[6] ppm | 0.1 | 50 |
| $NH_3$ conc. at TEx[7] ppm | 28 | 40 |
| Amt. of reflux[8] kg/hr | 112 | 107 |
| Supply amt.[9] kg/hr | 45 | — |

Notes:
[1]CE = combustion exhaust gas
[2]TE = $CO_2$-removing tower exit of gas
[3]Amount of aq. MEA solution supplied
[4]Temp. of aq. MEA solution at its supply line
[5]Temp. of treated gas at the exit of tower
[6]Conc. of MEA in the treated gas at tower exit
[7]Conc. of NH, in the treated gas at tower exit
[8]Total amount of reflux water in regeneration
[9]Supply amount of reflux water to the $CO_2$ absorption tower As described in detail above, it is now made possible to prevent emission of residual alkanolamine contained in the treated gas, which has been subjected to $CO_2$ removal, quite effectively, since a part of the reflux water from the spent absorbent solution regeneration tower is employed for scavenging the residual alkanolamine in the treated gas. At the same time, a suppression of ammonia emission into the atmosphere together with the treated gas can be achieved in some degree. It is also made possible to dispense with installation of circulation of water at the overhead of the $CO_2$, absorption tower which has been necessary in the prior art. In addition, the use of a cooling means therefor is now unnecessary. The mass balance of water in the entire combustion gas treatment system can reliably be maintained by the adjustment of the temperature of aqueous MEA solution supplied to the absorption tower in such a manner that the temperatures of the $CO_2$-denuded gas at the entrance and the exit will be substantially identical.

We claim:

1. An apparatus for removing $CO_2$ from a combustion exhaust gas by contacting said exhaust gas with an absorbent containing an aqueous solution of an alkanolamine, comprising:
    a packed first contact section for effecting counterflow contacting engagement of said combustion exhaust gas with said aqueous alkanolamine solution for removing $CO_2$ from said gas;
    indirect cooling means disposed downstream with respect to flow of said combustion exhaust gas of said first contact section for cooling said combustion exhaust gas and producing condensate from said gas after said removal of $CO_2$; and
    a second packed contact section disposed between said first contact section and said cooling means for effecting counterflow contacting engagement of said condensate produced by said cooling means with said combustion exhaust gas after said removal of $CO_2$.

2. An apparatus for removing $CO_2$ from a combustion exhaust gas by contacting said exhaust gas with an absorbent containing an aqueous solution of an alkanolamine, comprising:
    a tower having a lower end part and an upper end part;
    an exhaust gas inlet in said lower end part of said tower and a treated gas outlet in said upper end part of said tower;
    a first contact section in said tower above said lower end part for the flow of exhaust gas from said exhaust gas inlet upwardly therethrough;
    means for introducing an aqueous alkanolamine solution into said tower above said first contact section for the flow of aqueous alkanolamine solution through said first contact section in counterflow contacting relationship with said combustion exhaust gas passing through said first contact section for removal of $CO_2$ from said combustion exhaust gas in said first contact section;
    cooling means upstream of said exhaust gas inlet with respect to combustion exhaust gas flow for cooling said combustion exhaust gas and condensing water therefrom to provide condensate from said exhaust gas of $CO_2$ therefrom in said first prior to flow of said exhaust gas to said exhaust gas inlet;
    a second contact section between said means for introducing said aqueous solution and said treated gas outlet for producing counterflow contacting engagement in said second contact section of said condensate produced by said cooling means with said combustion exhaust gas after removal of $CO_2$ therefrom in said first contact section;
    a water supply section disposed above and downstream of said second contact section in said tower for supplying water in counterflow contacting relationship with said combustion exhaust gas in said second contact section; and
    means for supplying said condensate produced by said cooling means to said water supply section to provide said water therefor.

3. A process for removing $CO_2$ from a combustion exhaust gas in the apparatus as claimed in claim 1, comprising:
    effecting counterflow contacting engagement of an aqueous alkanolamine solution with a combustion exhaust gas in said first contact section of said apparatus;
    maintaining said combustion exhaust gas after removal of $CO_2$ therefrom in said first contact section at a temperature higher than the saturation point of moisture in said combustion exhaust gas supplied to said first contact section;
    condensing an amount of moisture in the $CO_2$ depleted combustion exhaust gas just sufficient to maintain constant the concentration of the aqueous alkanolamine solution in said first contact section; and
    supplying condensate produced in said condensing step to said second contact section in counterflow contacting engagement with said gas.

4. A process for removing $CO_2$ from a combustion exhaust gas using the apparatus as claimed in claim 2, comprising:
    cooling a combustion exhaust gas by said cooling means;
    effecting counterflow contacting engagement of an aqueous alkanolamine solution with said combustion exhaust gas in said first contact section in said tower; and
    supplying condensate formed in said cooling means through said water supply section to said second contact section in an amount just sufficient to maintain constant the concentration of the aqueous alkanolamine solution in said first contact section.

* * * * *

UNITED STATES PATENT AND TRADEMARK OFFICE
CERTIFICATE OF CORRECTION

PATENT NO. : 5,318,758
DATED : June 7, 1994
INVENTOR(S) : FUJII et al.

It is certified that error appears in the above-identified patent and that said Letters Patent is hereby corrected as shown below:

On the title page, left column at [75] Inventors: "Touro Seto" should read --Touru Seto--.

Signed and Sealed this

Thirtieth Day of August, 1994

Attest:

BRUCE LEHMAN

Attesting Officer

Commissioner of Patents and Trademarks